United States Patent [19]

Sugasaka et al.

[11] Patent Number: 5,285,377
[45] Date of Patent: Feb. 8, 1994

[54] CONTROL APPARATUS STRUCTURING SYSTEM

[75] Inventors: Tamami Sugasaka; Minoru Sekiguchi; Shigemi Nagata, all of Kawasaki, Japan

[73] Assignee: Fujitsu Limited, Kawasaki, Japan

[21] Appl. No.: 785,001

[22] Filed: Oct. 30, 1991

[30] Foreign Application Priority Data

Oct. 30, 1990 [JP] Japan .................................. 2-292449

[51] Int. Cl.$^5$ ...................... G06F 15/18; G05B 23/02
[52] U.S. Cl. ................................. 364/148; 364/152; 364/164; 395/23; 395/903
[58] Field of Search ................. 364/130, 148, 149–151, 364/152, 164, 165; 395/20–27, 903, 904

[56] References Cited

U.S. PATENT DOCUMENTS

| | | | |
|---|---|---|---|
| 5,111,531 | 5/1992 | Grayson et al. | 364/162 X |
| 5,119,468 | 6/1992 | Owens | 364/151 X |
| 5,159,660 | 10/1992 | Lu et al. | 364/148 X |
| 5,175,678 | 12/1992 | Frerichs et al. | 364/148 |

Primary Examiner—Joseph Ruggiero
Attorney, Agent, or Firm—Staas & Halsey

[57] ABSTRACT

A control apparatus structuring system for facilitated handling of a nonlinear control object, using a generic form of control rules, and which stably reaches a target value by setting plural virtual target values corresponding to the system states and by selecting one according to the distance to the target value. A processor performs a signal conversion function to realize input/output characteristics for a given teacher signal group. A virtual target controller controls advance knowledge about data relations between control state volumes. A calculator calculates a correction volume of a control state volume from the control state volume of a control object and a virtual target value defined by the control data of the virtual target controller corresponding to the control state volume. The system structures the processor to a desired control apparatus by giving an input of the control state volume to the processor, by supplying an output as the control operation volume to the control object, by obtaining a teacher signal through a correction of the control operation volume according to the correction volume then outputted from the calculator. The processor receives the difference between a current state volume and a targeted control state volume. The virtual target controller controls the advance knowledge about data relations between control state volumes by parametrizing the difference between a control state volume and its control target value.

11 Claims, 11 Drawing Sheets

L1 : BASE LINK
L2 : LINK $$J \cdot \ddot{\theta} = T + B$$

$$J_{11} = \tfrac{1}{4}m_1 l_1^2 + m_2 l_1^2 + \tfrac{1}{4} m_2 l_2^2 \sin^2 \theta_2$$

$$J_{12} = \tfrac{1}{2} m_2 l_1 l_2 \cos \theta_2$$

$$J_{21} = \tfrac{1}{2} m_2 l_1 l_2 \cos \theta_2$$

$$J_{22} = \tfrac{1}{4} m_2 l_2^2$$

$$T_1 = T$$

$$T_2 = 0$$

$$B_1 = \tfrac{1}{2} m_2 l_1 l_2 \sin \theta_2 \cdot \dot{\theta}_2^2 - \tfrac{1}{2} m_2 l_2^2 \cos \theta_2 \sin \theta_2 \cdot \dot{\theta}_1 \dot{\theta}_2$$

$$B_2 = -\tfrac{1}{2} m_2 g l_2 \sin \theta_2 - \tfrac{1}{4} m_2 l_2^2 \cos \theta_2 \sin \theta_2 \cdot \dot{\theta}_1^2$$

Fig. 4

CONTROL APPARATUS STRUCTURING SYSTEM

BACKGROUND OF THE INVENTION

This invention pertains to a control apparatus structuring system for structuring a control apparatus for controlling a control object, and more particularly to a control apparatus structuring system for structuring a control apparatus for handling a nonlinear control object with ease and with a generally applicable set of control rules.

A classical PID control cannot control a complex object such as an inverted pendulum having one (1) input and two (2) outputs. Therefore, a modern control theory is applied to a designing a control apparatus.

However, when a linear control theory of the modern control theories is used, because the control object model is structured by linearizing the equation of motion of a control object, a problem arises that the control performance deteriorates outside of a linear region.

Also, when a nonlinear control theory of the modern control theories is used, because the equations of motions need to be written definitively and completely, the parameters of a control object need to be defined precisely. The disadvantage is that this is extremely difficult.

With such a background, a new mode of control apparatuses using neural networks is being proposed.

DESCRIPTION OF THE RELATED ARTS

A neural network acquires the input/output characteristics of a received group of teacher signals through learning. Thus, a neural network has an adaptive data processing function, such as supplying a likely output signal upon receiving an unknown input signal.

In structuring a control apparatus with a neural network, a method is taken whereby a control apparatus is structured by receiving a sufficient number of control data from a control object and by projecting the set of control rules for a control object on the neural network.

However, in reality, it is next to impossible to obtain control data for a more complex control object. Although some advanced qualitative knowledge has recently been obtained to cope with this, many of the quantitative aspects need to be further analyzed. A new proposal is made for a control object in need of a further qualitative analysis, such that a teach signal obtained by a trial is used in projecting a set of control rules on a neural network. (SAITO, KITAMURA, "A control through learning for stabilizing an inverted pendulum by using a multi-layered neural network", 1990 Proceedings of Robotics and Mechatronics, pages 283 through 286)

The method proposed in the referenced article utilizes a neural network, a virtual target generator and an evaluator for holding an inverted pendulum on a truck.

The newly equipped virtual target generator mathematically expresses a knowledge obtained in advance that "the farther the truck position is away from the origin, the more declined the virtual target angle of a pendulum towards the origin from the vertical direction", and generates a set of virtual target values for the angle and angular velocity of the pendulum to put the pendulum back to the origin when the truck position and velocity are given. The newly equipped evaluator obtains a correction volume on the force applied to a truck by evaluating the desired difference between a generated set of virtual target values and a set of control outputs (the angle and angular velocity of a pendulum) after one (1) sampling, and designates the force corrected by the correction volume as a teacher signal.

The neural network outputs a force to be applied to the truck based on an input comprising the angle and angular velocity of the pendulum, as well as the position and velocity of the truck. The neural network performs its learning by a back propagation method based on the teacher signal created by the evaluator.

This configuration enables a neural network to be built as a control apparatus for the control object by projecting a set of control rules for a control object, which is qualitatively known to some extent yet quantitatively unknown to a large extent, on a neural network by using a teacher signal obtained by a trial.

Long proposed has been a control apparatus for performing a control through a learning by a virtual value called a virtual target value for expressing an intermediate state realizable by a system and by learning an input/output relation for realizing the virtual target value. However, because it uses only one (1) virtual target value, it has a disadvantage that the performance deteriorates, when the system state changes intricately. Therefore, this invention aims at improving a system control performance by setting a plurality of virtual target values corresponding to system states.

It is true that the new proposal has an advantage of building a control apparatus for a nonlinear control object with ease, but it is not without its disadvantage of having to repeat a learning each time the target value of a control state volume is revised. This is due to the following reasons arising out of the above configuration.

Because the virtual target generator generates a set of virtual target values for the angle and angular velocity of the pendulum to put the pendulum back to the origin when the position and velocity of the truck is given, the virtual target generator outputs a set of virtual target values for a control state volume corresponding to an input of the absolute value of a control state volume.

Because the neural network receives the angle and angular velocity of the pendulum, as well as the position and velocity of the truck, at respective sampling times, the neural network receives the absolute value of a control state volume.

Although this is not discussed above, since the evaluator needs to find the correction volume for the force to be applied to the truck, according to a complex objective function changing the response characteristics of a control object, the evaluator has a problem of setting a set of control rules not exactly analogous to the response characteristics intrinsic to the control object and a problem of failing to execute a building of the control apparatus in a short period of time.

SUMMARY OF THE INVENTION

The present invention aims at providing a new control apparatus structuring system capable of structuring a control apparatus for handling a nonlinear control object with ease and in a generic form of control rules.

This invention also aims at stably reaching the target value by setting plural virtual target values corresponding to the system states and by selecting one according to the distance to the target value.

A processor performs a signal conversion function to realize the input/output characteristics for a given teacher signal group.

A virtual target controller controls the advance knowledge about data relations between control state volumes.

A calculator calculates a correction volume of a control state volume from the control state volume of a control object and a virtual target value defined by the control data of the virtual target controller corresponding to the control state volume.

The control apparatus structuring system structures the processor to a desired control apparatus by giving an input of the control state volume to the processor, by supplying an output as the control operation volume to the control object, by obtaining a teacher signal through a correction of the control operation volume according to the correction volume then outputted from the calculator.

The processor receives the difference between a current state volume and a targeted control state volume.

The virtual target controller controls the advance knowledge about data relations between control state volumes by parametrizing the difference between a control state volume and its control target value.

BRIEF DESCRIPTION OF THE DRAWINGS

FIG. 4 lists equations of motions of base links $L_1$ and $L_2$;

DESCRIPTION OF A PREFERRED EMBODIMENTS

Underlying Principle

Before an embodiment of this invention is explained, its underlying principle is explained.

Figure 1:
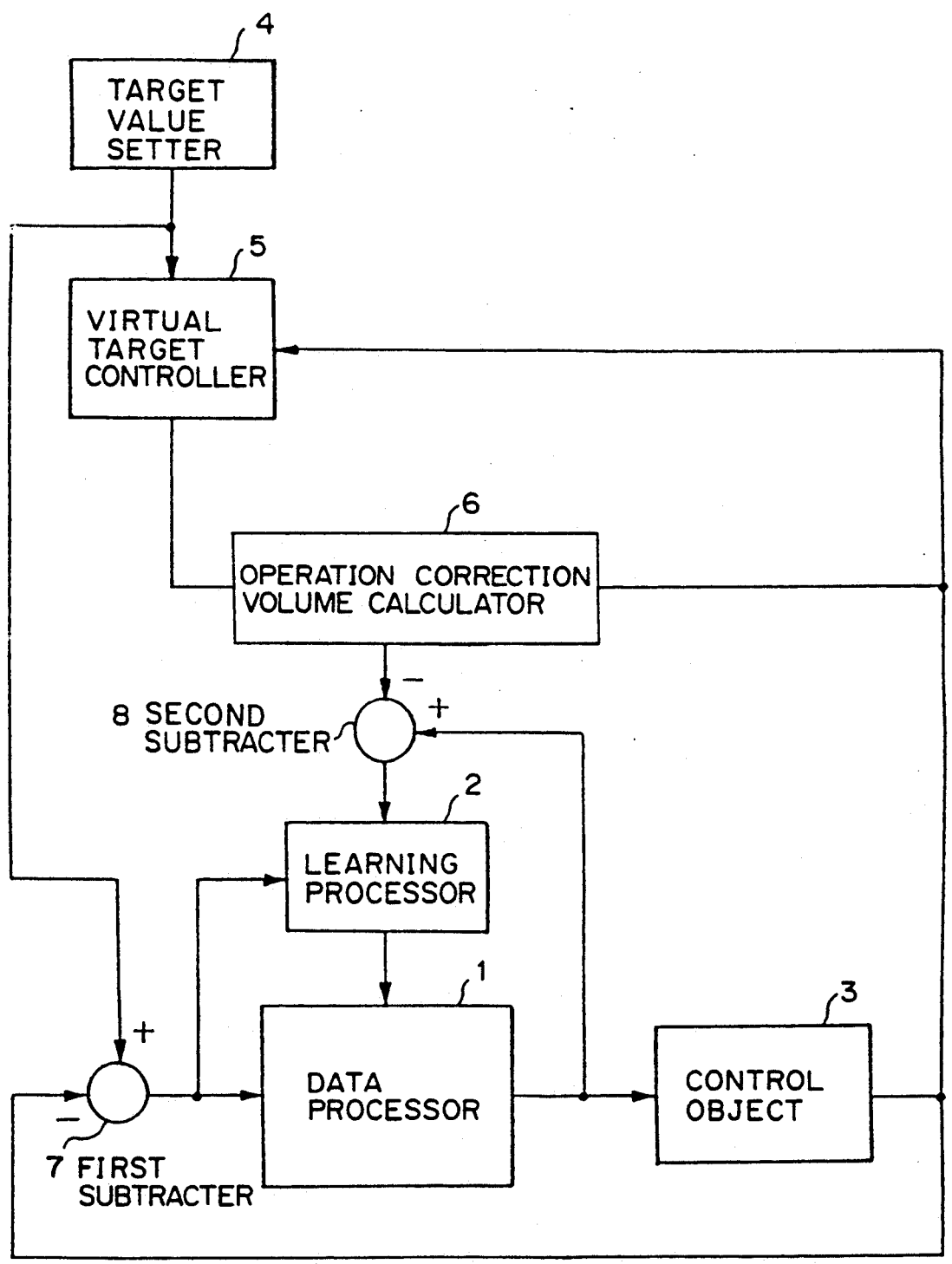
FIG. 1 is a block diagram designating a principle of this invention.

FIG. 1 is a block diagram designating a principle of this invention.

A data processor 1 has a variable signal conversion function capable of setting its signal conversion function to one realizing an input/output characteristics of a given group of teacher signals. The data processor 1 structured as a control apparatus outputs a control operation volume for putting a control object 3 to its targeted control state on receiving the control state volume and target value for the control object 3.

The data processor 1 can be configured by a network structure composed of an internal combination among basic units. Each basic unit calculates a sum of products, where each product term is obtained by multiplying one input by a corresponding internal state value, and an output value obtained by converting the sum of the products by a predetermined function.

Alternatively, the data processor 1 can also be configured by a fuzzy control apparatus, which describes the qualitative data relations between a control state volume and a control operation volume in a set of IF-THEN rules, as well as the qualitative attributes of the control state volume and control operation volume described by the set of IF-THEN rules in a membership function.

A learning processor 2 performs a learning for enabling the signal conversion function of the data processor 1 to realize the input/output characteristics of a given group of teacher signals. When the data processor 1 is configured by a network structure, the learning processor 2 performs a learning algorithm such as a widely known back propagation method.

A control object 3 is controlled by the data processor 1 structured as its control apparatus. Although it is desirable to use a real control object as the control object 3, an unreal control object model can also be used.

A target value setter 4 sets a control state volume expressing a desired control state of the control object 3.

A virtual target controller 5 controls an advance knowledge of the data relations among control state volumes obtained for realizing a desired control state of the control object 3. The virtual target controller 5 according to this invention controls the control data of the advance knowledge by parametrizing the difference between a control state volume and its target value.

An operation correction volume calculator 6 calculates the correction volume of the control operation volume for the control object 3 necessary for realizing the target value of a control state volume from the control state volume of the control object 3 and the virtual target value of a control state volume specified by control data of the virtual target controller 5 corresponding to the control state volume.

The operation correction volume calculator 6 can be configured by calculating the correction volume of a control operation volume by appropriately weighting the difference between a control state of the control object 3 and a virtual target value outputted from the virtual target controller 5.

A first subtracter 7 calculates the differences between the control state volumes set by the target value setter 4 and those of the control object 3, and supplies the differences to the data processor 1 and the learning processor 2. The outputs from the first subtracter 7 may be weighted.

A second subtracter 8 calculates the differences between the control operation volumes outputted from the data processor 1 and the correction volumes for the control operation volumes outputted from the operation correction volume calculator 6, and supplies the differences, which are adjusted by the correction volumes calculated by the control operation volumes outputted from the data processor 1, to the learning processor 2.

This invention has a configuration such that, upon an output of the initial value of a control state from the control object 3 when the signal conversion function of the data processor 1 is initialized, the second subtracter 7 calculates the difference between the target value of a control state set by the target value setter 4 and the initial value of the control state volume, and supplies the difference to the data processor 1. Upon receiving the difference, the data processor 1 outputs the control operation volume defined by the initialized signal conversion function to the control object 3. Upon receiving the control operation volume, the control object 3 shifts to a control state different from the initial state. The processes are repeated until the control state of the control object 3 reaches a predetermined limit.

Upon receiving a control state volume from the control object 3 during the processes, the virtual target controller 5 designates the virtual target value for a control state volume according to the control data. The virtual target controller 5 sets the virtual target value for one control state volume in response to another control state volume outputted from the control object 3, if the control object 3 is a control system having one (1) input and two (2) outputs.

When the virtual target controller 5 designates a virtual target value of a control state volume, the operation correction volume calculator 6 calculates a correction volume of a control operation volume for the control object 3 necessary for realizing the target value of the control state volume by using the virtual target value.

The operation correction volume calculator 6 determines how to correct a control operation volume outputted from the data processor 1 at this processing moment, for determining the target control state volume set by the target value setter 4 according to the calculation of the correction volume.

When a group of teacher signals comprising the difference of the control state volume inputted to the data processor 1 and the more preferable control operation volume at the input moment of the difference are thus obtained, the learning processor 2 learns the signal conversion function of the data processor 1 and adjusts the signal conversion function to a more appropriate one in realizing the targeted control state.

The processes are repeated according to the signal conversion function such that the next group of teacher signals are generated. Thus, the signal conversion function of the data processor 1 is adjusted to the one realizing the targeted control state, thereby structuring the data processor 1 as a control apparatus.

To summarize, this invention causes teacher signals for the control object 3, which is qualitatively known to some extent through an advance knowledge yet quantitatively unknown to a large extent, to be obtained by a trial, the teacher signals to project control rules for the control object 3 over to the signal conversion function of the data processor 1, and data processor 1 to be structured according to the difference from the target value of a control state volume in structuring the data processor 1 as a control apparatus for the control object 3, thereby shedding the necessity for starting a learning over again, even if the target value of a control state volume changes.

Even when a target position changes, an input to a control object, e.g. for inverting it, with respect to a difference between a target position and a current position. That is, the input to the control object changes only by the difference and does not change by the target position unless the difference is changed. Therefore, the same input to the control object could be used for a different control object. Thus, a mere learning of an input to a control object with respect to the difference enables a control to be performed according to the difference, thereby eliminating a need for restarting a learning all over.

This invention enables, by an advance learning of a difference between a current value and a target value in relation to a corresponding input value to a control object, to hold a control state volume within a predetermined value range, i.e. to hold the control object to a desired target position in a desired control state. This invention enables a position at which the control object (for example, a pendulum) is inverted and stands, to move at a certain speed with the control object kept inverted, by providing the target value setter 4.

This invention can also set a plurality of virtual target curves showing the dependency relations among variables of the control object and causes one (1) to be selected from the plural controllers for respective virtual target curves, according to a control state volume of the control object.

This invention can further set a plurality of virtual target curves showing the dependency relations among variables of the control object and causes one (1) of the virtual target curve of a particular variable according to a partial region of the variable for the control object.

EMBODIMENTS

This invention is explained in further detail by referring to embodiments.

Figure 2:
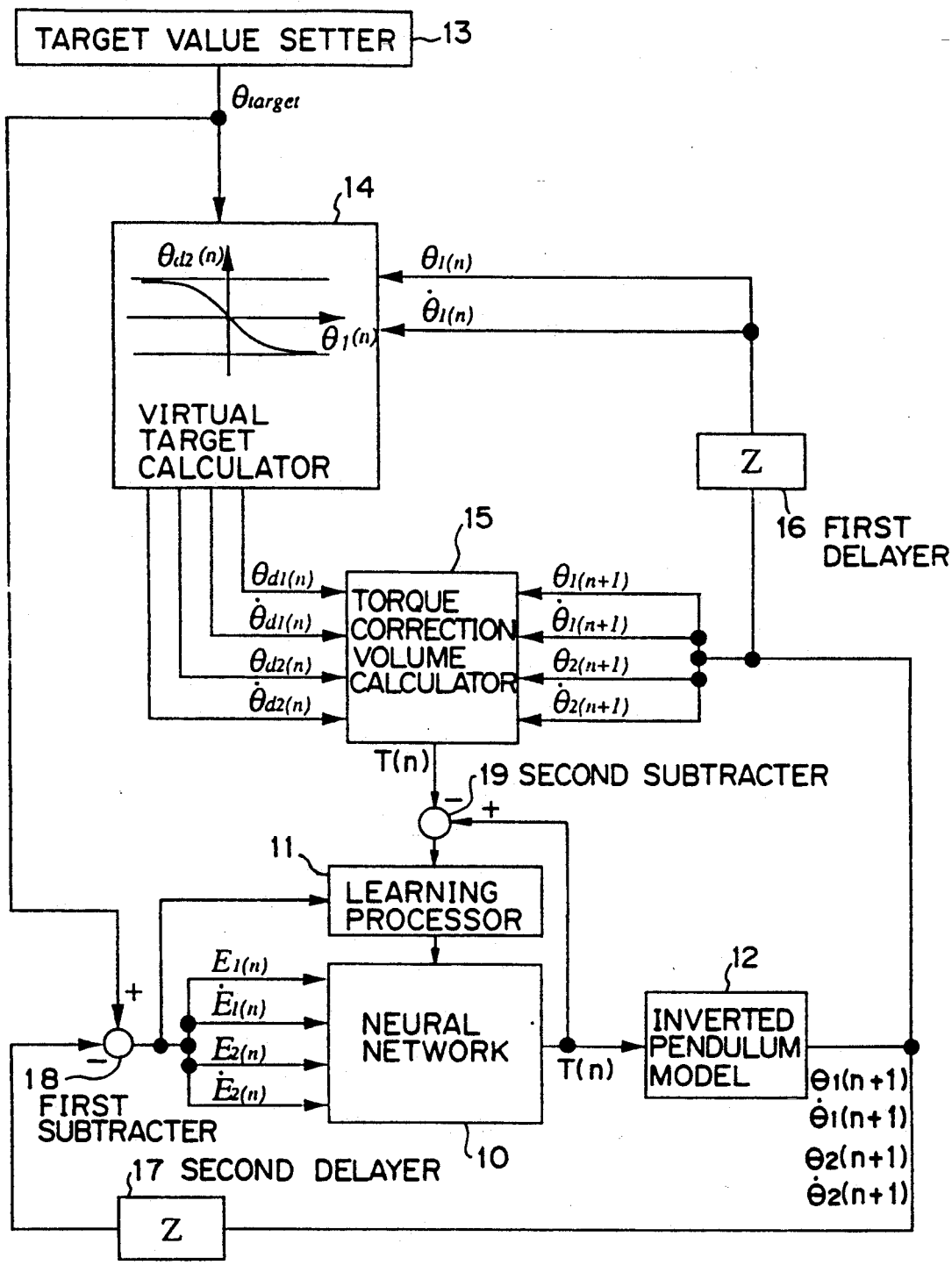
FIG. 2 shows a block diagram of an embodiment of this invention.

FIG. 2 shows a block diagram of an embodiment of this invention.

A neural network 10 operates as a control apparatus.

A learning processor 11 executes the learning of the neural network 10.

An inverted pendulum model 12 is a control object, being a system having one (1) input and two (2) outputs.

A target value setter 13 sets the target value for a control state volume of the inverted pendulum model 12.

A virtual target calculator 14 calculates the virtual target for a control state volume of the inverted pendulum model 12.

A torque correction volume calculator 15 calculates a correction volume of the torque outputted from the neural network 10.

A first delayer 16 supplies to the virtual target calculator 14 a control state volume outputted from the inverted pendulum model 12 delayed by one (1) sampling period.

A second delayer 17 delays a control state volume outputted from the inverted pendulum model 12 by one (1) sampling period.

A first subtracter 18 calculates the difference between the target value of a control state volume set by the target value setter 4 and the control state volume outputted from the second delayer 17 and supplies the difference to the neural network 10 and the learning processor 11.

A second subtracter 19 calculates the difference between a torque outputted from the neural network 10 and the torque correction volume outputted from the torque correction volume calculator 15, and supplies the difference to the learning processor 11. In FIG. 2, (n) indicates a particular sampling moment.

Figure 3:
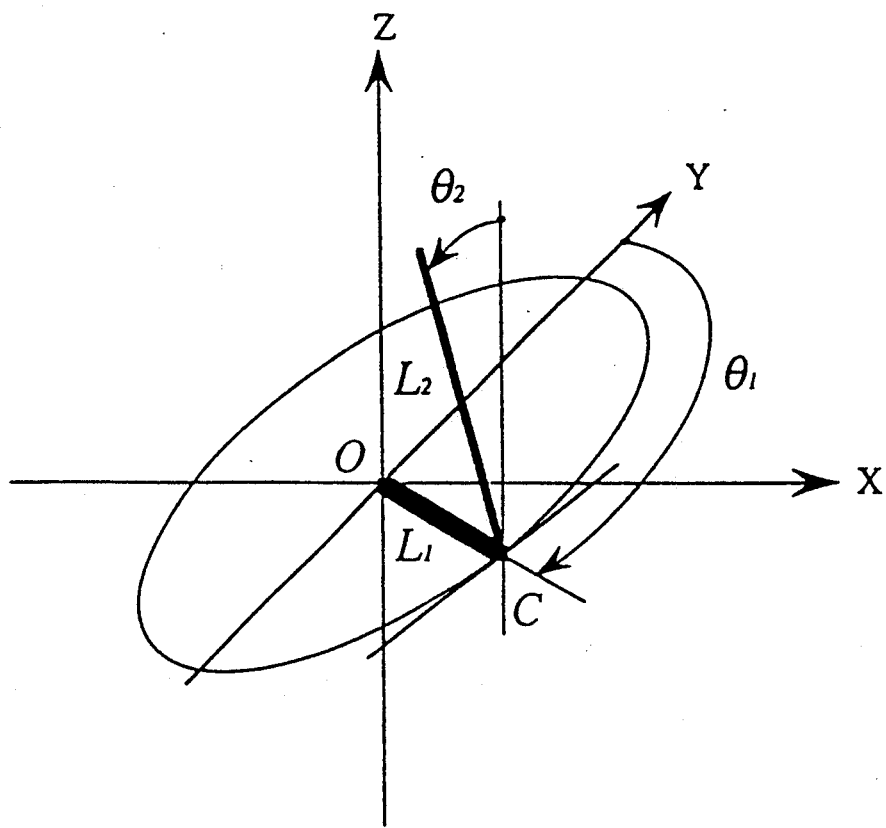
FIG. 3 illustrates an inverted pendulum model which is a control object shown in FIG. 2.

FIG. 3 illustrates an inverted pendulum model 12, which is a control object shown in FIG. 2.

As shown in FIG. 3, the inverted pendulum model 12 comprises a base link and a link, with one end of the base link $L_1$ connected to a motor shaft (Z axis) at the origin O and the other end C of the base link $L_1$ connected to one end of the link $L_2$, such that the base link $L_1$ forms the rotational axis of the link $L_2$.

FIG. 4 lists equations of motion for base link $L_1$ and link $L_2$.

In FIG. 4, the equations of motion express respective rotational angles of the base link $L_1$ and the link $L_2$ as $\theta_1$ and $\theta_2$ respective masses of the base link $L_1$ and the link $L_1$ as $m_1$ and $m_2$, respective lengths of the base link $L_1$ and the link $L_2$ as $l_1$ and $l_2$ as $L_1$ and $L_2$, the gravitational acceleration as g, and a motor torque as T.

This embodiment aims at controlling the inverted pendulum model 12, according to the above equations of motions. More specifically, a pendulum is inverted by controlling the torque T and held in the appropriate position by giving feedbacks for respective states of the base link $L_1$ and the link $L_2$.

Thus, the inverted pendulum model 12 has four (4) controlled parameters, $[\theta_1, \theta_2, \dot\theta_1, \dot\theta_2]$ as well as one (1) controlled variable the motor torque T.

Hence, when the target value setter 13 sets $[\theta t_1, \theta t_2, \dot\theta t_1, \dot\theta t_2]$ as the target values of the controlled parameters, the first subtracter 18 calculates the following differences, and supplies them to the neural network 10.

$$E_1 = \theta_{t1} - \theta_1$$

$$(d/dt)E_1 = (d/dt)\theta_{t1} - (d/dt)\theta_1$$

$$E_2 = \theta_{t2} - \theta_2$$

$$(d/dt)E_2 = (d/dt)\theta_{t2} - (d/dt)\theta_2$$

For the convenience of an explanation, the total derivative e.g. of an angular velocity is also expressed as $(d/dt)$.

Figure 5:
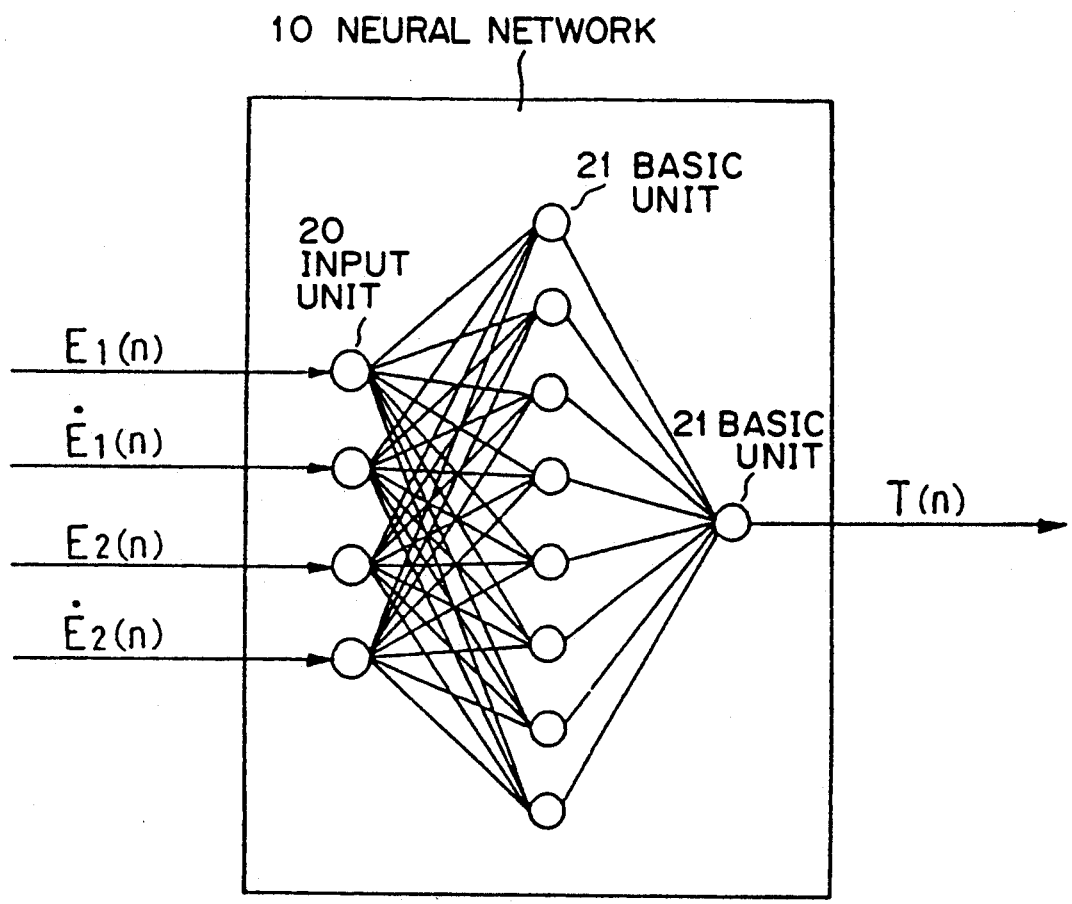
FIG. 5 shows a configuration of a neural network.

FIG. 5 shows a configuration of a neural network.

Thus, the neural network 10 must have four (4) units in its input layer and one (1) unit in its input layer. As shown in FIG. 5, the neural network 10 of this embodiment comprises four (4) input units in the input layer, eight (8) basic units 21 in its onestage middle layer and one (1) output unit 21 in the output layer. The neural network 10, which forms a layered network, weights internal combinations between the input units 20 and the basic units 21 in the middle layer, as well as those between the basic units 21 in the middle layer and the basic unit 21 in the output layer.

The input units 20 in the input layer distribute the input signal values "as is" to the basic units 21 in the middle layer. The basic units 21 in the middle layer and the output layer each have a multiplier for multiplying plural inputs by respective weights of internal combinations and an accumulator for accumulating the products, i.e. the weighted inputs, and a thresholder for outputting a final output by nonlinearly quantizing the sum of the products. The learning processor 11 executes the learning of respective weights for the internal combinations in order to realize the input/output characteristics of the teacher signal group.

The virtual target calculator 14 calculates and outputs virtual target value $\theta_{d2}$ of rotational angle $\theta_2$ of the link $L_2$ and virtual target value $(d/dt)\theta_{d2}$ of angular velocity $(d/dt)\theta_2$, based on an advance knowledge of control that "rotational angle $\theta_1$ of the base link $L_1$ comes closer to the target position by declining rotational angle $\theta_2$ of the link $L_2$ towards a target position when rotational angle $\theta_1$ of the base link $L_1$ points away from the target position. That is, the virtual target calculator 14 receives target value $\theta_{t1}$ of the rotational angle $\theta_1$ of the base link $L_1$ from the target value setter 13, as well as rotational angle $\theta_1$ and its angular velocity $(d/dt)\theta_1$ of the base link $L_1$ from the inverted pendulum model 12 through the first delayer 16. Then, the virtual target calculator 14 calculates virtual target value $\theta_{d2}$ of rotational angle $\theta_2$ and virtual target value $(d/dt)\theta_{d2}$ of its angular velocity $\theta_2$ of the link $L_2$, according to the following equations.

$$\theta_{d2} \theta_{2max}[2/(1+exp.(\theta_1 - \theta_{t1})) - 1]$$

$$(d/dt)\theta_{d2} = -\theta_{2max}[2exp.(\theta_1 \theta_{t1})/(-1+exp.(\theta_1-\theta_{t1}))^2](d/dt)\theta_1$$

Here, $\theta_{2max}$ is the maximum declining angle of rotational angle $\theta_{t2}$ of the link $L_2$. The virtual target calculator 14 outputs "as is", as target values for rotational angle $\theta_1$ and its angular velocity $(d/dt)\theta_1$ of the base link $L_1$, those values supplied from the target value setter 13. Although the above equations are expressed as sigmoid functions, it is also possible to use equations such that $\theta_1$ is proportional to $\theta_{d2}$. As is evident from these equations, when rotational angle $\theta_1$ of the base link $L_1$ reaches target position $\theta_{t1}$, because virtual target value $\theta_{d2}$ of rotational angle $\theta_2$ of the link $L_2$ becomes zero (0), the pendulum is inverted.

The torque correction volume calculator 15 corrects the torque T applied to the base link $L_1$, such that rotational angle $\theta_2$ of the link $L_2$ approaches $\theta_{d2}$. That is, the torque correction volume calculator 15 receives, from the virtual target calculator 14, virtual target values $\theta_{d2}$ and $(d/dt)\theta_{d2}$ of rotational angle $\theta_2$ and its angular velocity $(d/dt)\theta_2$ of the link $L_2$, as well as the virtual target value $(d/dt)\theta_{d1}$ of angular velocity $(d/dt)\theta_1$ of the base link $L_1$ (, which matches the actual target value $(d/dt)\theta_{t1}$). The torque correction volume calculator 15 also receives, from the inverted pendulum model 12, rotational angle $\theta_2$ and its angular velocity $(d/dt)\theta_2$ of the link $L_2$, as well as angular velocity $(d/dt)\theta_1$ of the base link $L_1$. Then, the torque correction volume calculator 15 calculates the torque correction volume $\Delta[T(n)]$ according to the following equation.

$$\Delta[T(n)] = K_1(\theta_{d2} - \theta_2) + K_2[(d/dt)\theta_{d2} - (d/dt)\theta_2] + K_3[(d/dt)\theta_{d1} - (d/dt)\theta_1]$$

The third term in this equation operates as a damper and is effective in fast stopping the inverted pendulum 12 near the target position of rotational angle $\theta_1$.

The second subtracter 19 calculates the difference $T'(n)$ between the torque $T(n)$ outputted from the neural network 10 and the torque correction volume $\Delta[T(n)]$, which is $$T'(n) = T(n) - \Delta T(n)$$

and notifies the learning processor 11 of the message that this difference is more preferable than the torque outputted from the neural network 10.

Thus, the learning processor 11 learns respective weights for the internal combinations of the neural network 10 according to an improved back propagation method proposed by this applicant as a pseudo impedance control method.

The learning is explained. First, the learning is performed by setting the base link $L_1$ or the arm at 30 degrees and the link $L_2$ or the pendulum at 0 degrees. Then, suppose that twenty (20) sampling values are obtained before the pendulum is turned over. These values are stored in a memory. The twenty (20) sampling values are used for automatically generating a torque value of a teacher signal, for updating weights of a neural network and for performing a learning.

Next, the second learning is performed by setting the arm at 30 degrees and the pendulum at 0 degrees, again. Then, forty (40) sampling values are obtained based on the weights determined by the twenty (20) sampling values. The forty (40) sampling values are stored in a memory as a new sampling value, and are used for updating the weights of a neural network and for learning.

A use of the weights finally stored in the neural network after moving the base link $L_1$ from zero (0) degree to ninety (90) degrees enables the control apparatus structuring system to hold the inverted pendulum 12 at a desired target position from any combination of an initial position and a target position(, as long as the difference between the initial position and the target position is between zero (0) degree and ninety (90) degrees). When the arm is moved from 0 degrees to 90 degrees a better network can be constructed. However, according to experiments it is found to be not always necessary for the arm to be moved across the whole range. A control is possible to some extent even if the difference between the initial position and the target position is more than the difference (for example, between 0 degrees and 90 degrees) which is used for the learning.

Even if the target position changes, a control torque for inverting is the same when there is no difference between the target position and the current position. That is, the control torque is changed only by the difference, and the control apparatus structuring system needs only the same control torque output even when the target position changes as long as the difference is the same. Consequently, this invention eliminates a duplication of learning when a target position changes, because a learning of a control torque for a particular difference enables a control to be performed by the difference.

Next, the effectiveness of the embodiment of this invention is explained by following the simulation result.

This simulation is made by assuming respective values of coefficients $K_1$, $K_2$ and $K_3$ used by the torque correction volume calculator 15 to be "1", "1" and "0.1". This invention causes $(d/dt)E_1$, an element in the difference outputted from the first subtracter 18, to be weighted by a coefficient value "0.1", before being input to the neural network 10.

The initial value of rotational angle $\theta_1$ is set to thirty (30) degrees. The initial value of rotational angle $\theta_2$ is set to zero (0) degree. Target value $\theta_{t1}$ of rotational angle $\theta_1$ is zero (0) degree. Target value $\theta_{t2}$ of rotational angle $\theta_2$ is set to zero (0) degree. The maximum declining angle of rotational angle $\theta_{2max}$ is set to twenty (20) degrees. The initial weights for respective internal combinations are randomly set between +0.01 and −0.01.

The simulated trials are as follows:

The states $[\theta_i(n), (d/dt)\theta_i(n)]$ (i=1, 2) of the inverted pendulum model 12 are sampled at sampling intervals of 0.01 seconds. The torque output from the neural network 10 to the base link $L_1$ of the inverted pendulum model 12 is calculated at each sampling interval. The states $[\theta_i(n+1), (d/dt)\theta_i(n+1)]$ (i=1, 2) of the inverted pendulum model 12 are changed by each torque output are simulated. A teacher signal is obtained by calculating a desirable output torque of the neural network 10 at each sampling interval. The processes are repeated for five hundred (500) steps, i.e. five (5) seconds.

A trial is terminated when the inverted pendulum declines by more than forty-five (45) degrees. Thus, a maximum of five hundred (500) teacher signals are obtained.

When teacher signals are thus obtained, the learning processor 11 learns the weights of the internal combinations of the neural network 10 according to the improved back propagation method. The learning is terminated when the number of steps reaches one hundred (100). The weights obtained at the end of the hundredth (100-th) step are set as the new weights for the neural network 10. Structuring of the neural network 10 for controlling the inversion of a pendulum, i.e. the inverted pendulum model 12, is simulated by repeating these processes.

FIGS. 6A through 6F show examples of simulated data.

Figure 6A:
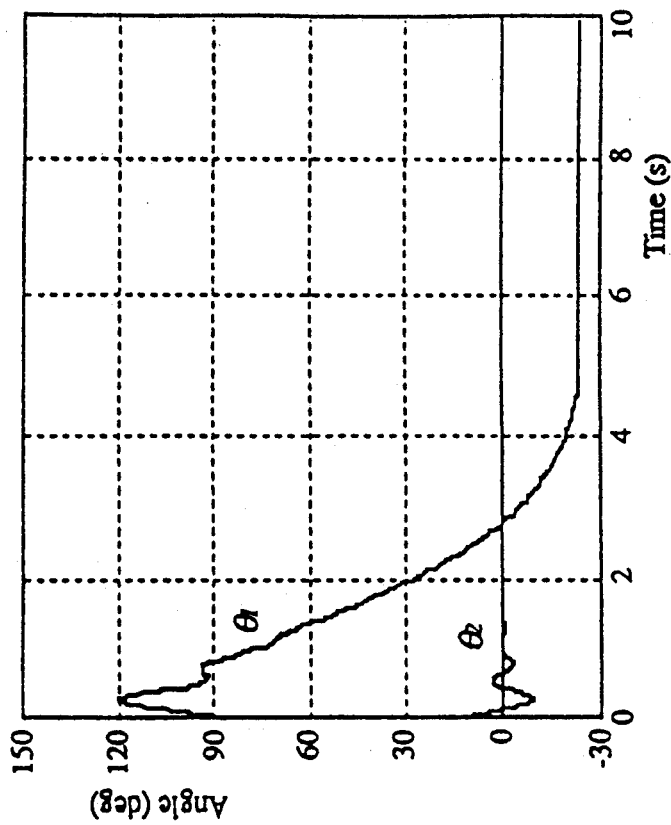
FIGS. 6A through 6F show examples of simulated data.

Simulated data shown in FIG. 6A illustrate the response of the inverted pendulum model 12, upon a completion of ten (10) trials, with respective initial values of rotational angles $\theta_1$ and $\theta_2$ being ninety (90) degrees and ten (10) degrees and respective target values $\theta_{t1}$ and $\theta_{t2}$ of rotational angles $\theta_1$ and $\theta_2$ both being zero (0) degrees.

Figure 6B:
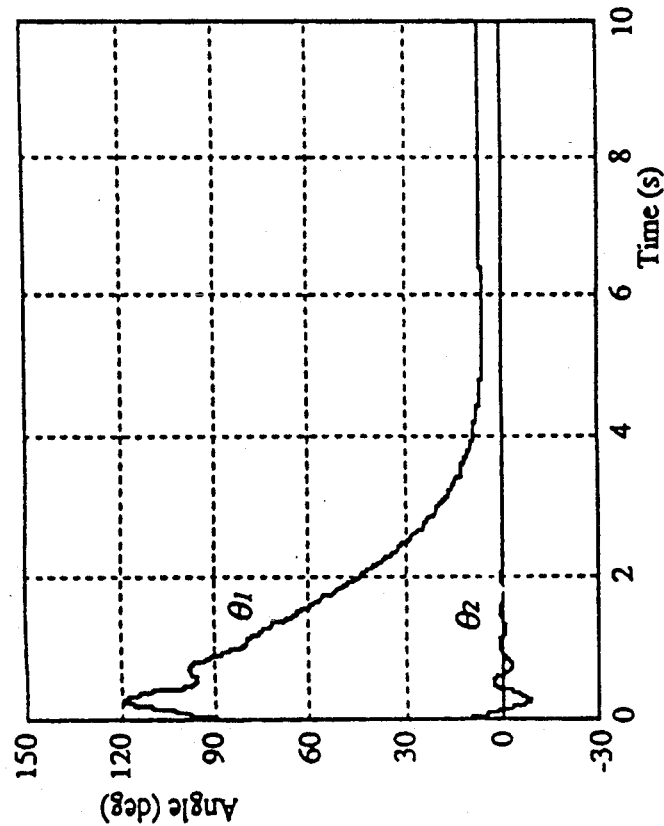
Figure 6D:
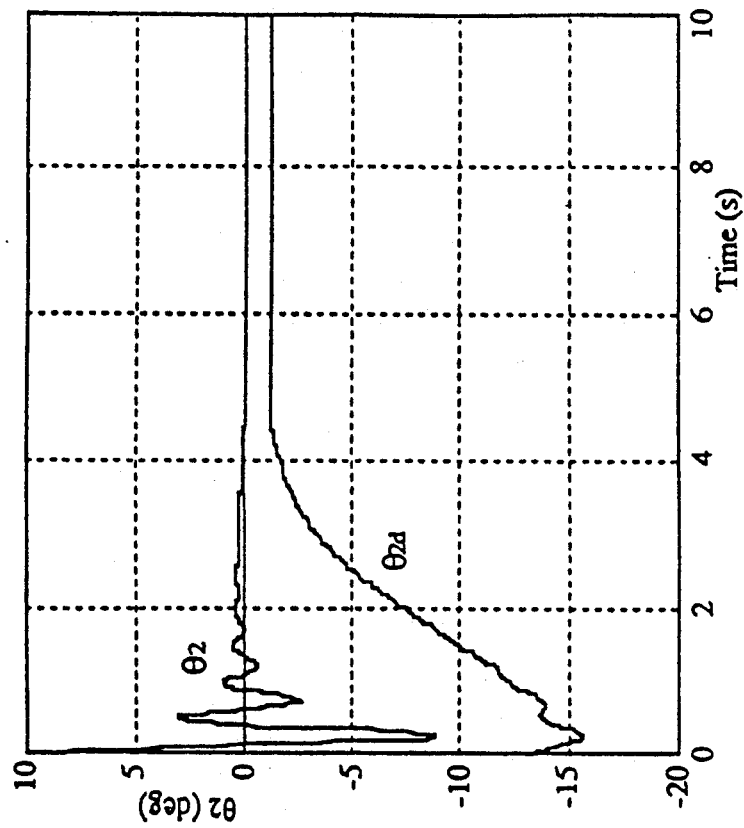
Figure 6C:
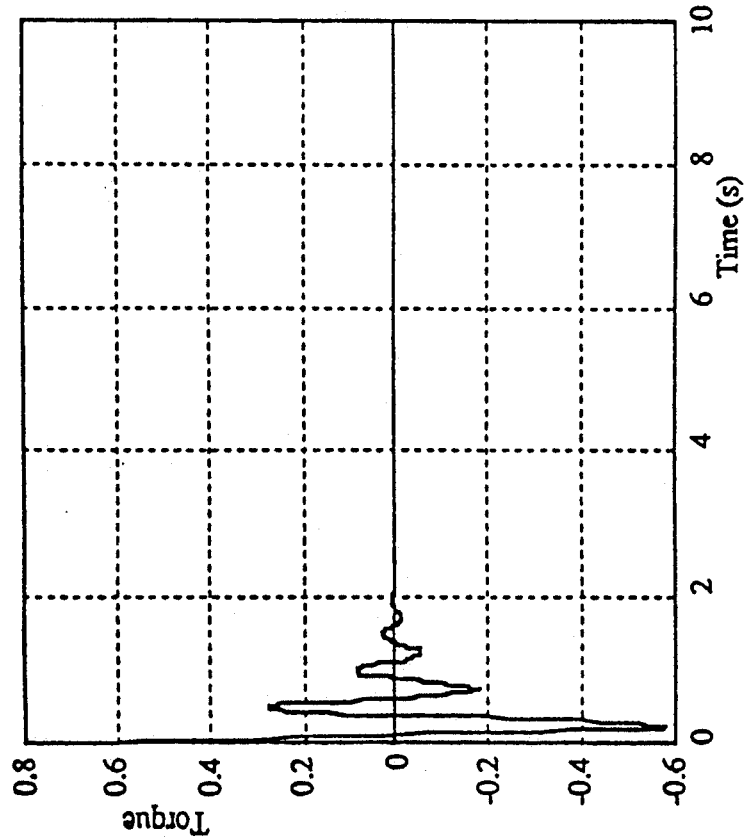

Simulated data shown in FIG. 6C illustrate the torque curve obtained by the simulation shown in FIG. 6A. Simulated data shown in FIG. 6D illustrate the responses of rotational angle $\theta_2$ and virtual target value $\theta_{d2}$.

In both simulations shown in FIGS. 6A and 6B, the object is put within the targeted control states after approximately five (5) seconds. Thus, since this invention causes the neural network 10 to be structured as a controlling apparatus of the neural network 10, according to the difference between the control state volumes and their target values, even if the neural network 10 has control states different from the one for which a control apparatus is structured, the inverted pendulum model 12 is controlled to desired control states.

Figure 6F:
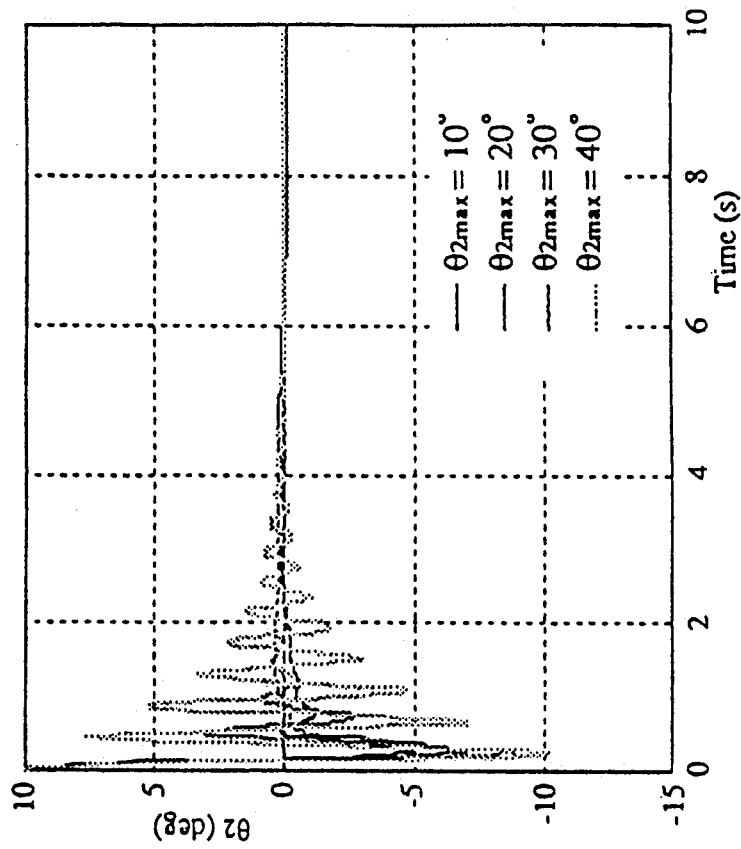
Figure 6E:
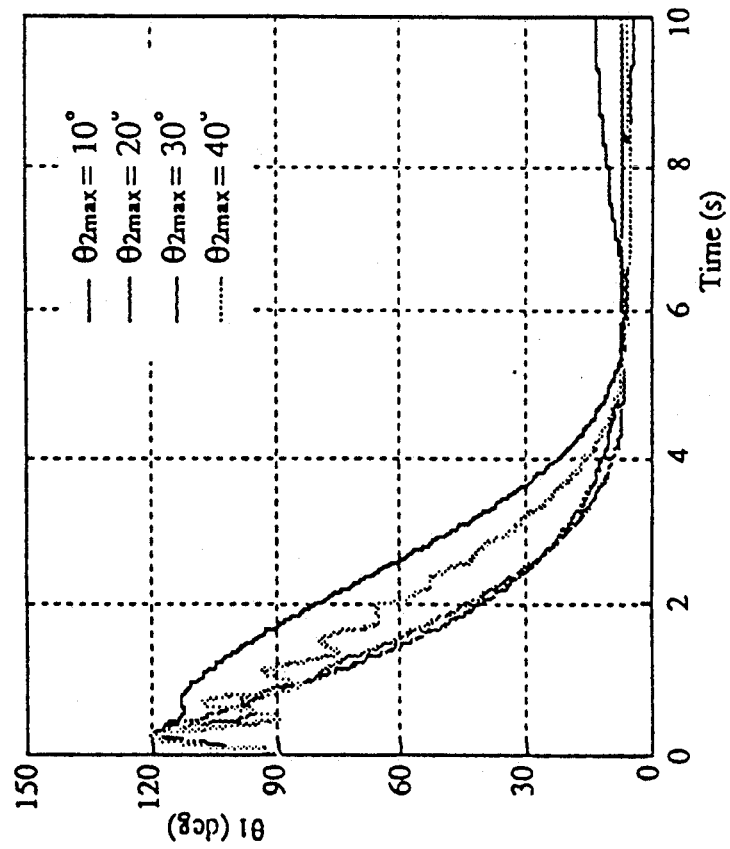

Simulated data shown in FIGS. 6E and 6F illustrate the responses of rotational angles $\theta_1$ and $\theta_2$ for ten (10) trials respectively by setting ten (10) degrees, thirty (30) degrees, and forty (40) degrees. It is apparent, from those simulated data, that the responses of the inverted pendulum model 12 do not change materially.

Although an embodiment of this invention has been explained by following the drawings, it is by no means limited to that shown in the drawings. Although an embodiment is disclosed having a neural network structure as a control apparatus as an example, this invention is applicable "as is" to any data processor capable of adjusting its signal conversion functions, according to the teacher signal.

Also, although this embodiment discloses a case of controlling an inverted pendulum as a control object of this invention, this invention is not limited to such but is also applicable to any control object. Also, although an embodiment is disclosed in which a structuring of a control apparatus is structured for a control object model instead of for an actual control object, because a control object model identifies a precise system including Coulomb friction, etc., a more appropriate control apparatus may be structured.

A stabilization control system for an inverted pendulum is explained as another embodiment of this invention.

An empirical rule used in this embodiment is that "when a man walks to a new position with a rod like a sweeper, he walks by declining the rod towards the moving direction". When the rule is applied to this invention, "the base link $L_1$ for inverting the inverted pendulum 12 moves to a target position by declining the inverted pendulum 12 towards the target position".

Figure 7:
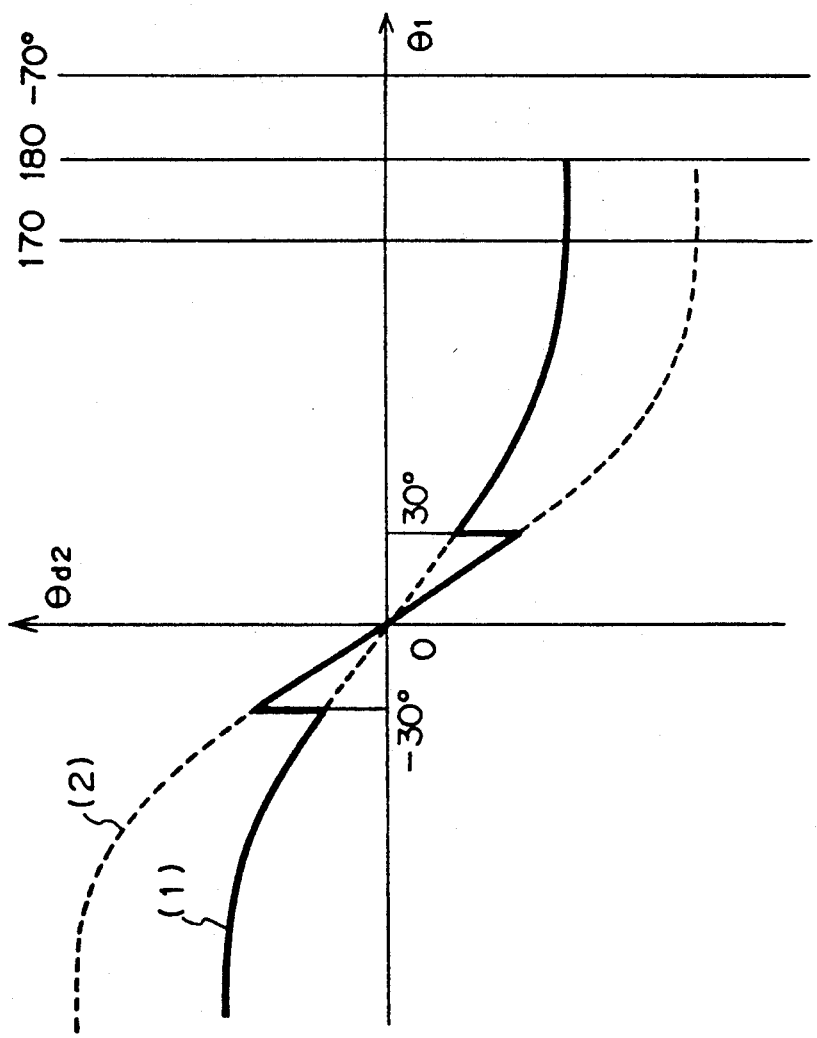
FIG. 7 shows two (2) graphical representations of empirical functions.

FIG. 7 shows two (2) graphical representations of empirical functions.

As described earlier, $\theta_1$ is a rotational angle of the base link $L_1$, and $\theta_{d2}$ is a virtual target value for rotational angle $\theta_1$. The origin shown in FIG. 7 represents a target position of the base link $L_1$. When rotational angle $\theta_1$ is on the positive side from the target position, rotational angle $\theta_2$ of the link $L_2$ declines towards the negative side (towards the target position). When rotational angle $\theta_1$ is on the negative side from the target position, rotational angle $\theta_2$ of the link $L_2$ declines towards the positive side (towards the target position).

The two (2) functions shown in FIG. 7 have different rotational angles $\theta_2$ of the link $L_2$. By reducing the gradient of a virtual target value the inverted pendulum 12 is made difficult to decline. By increasing the gradient of a virtual target value the inverted pendulum 12 is made faster to come back to a target position. Hence, by suitably using two (2) kinds of virtual target values, it becomes possible not to fall easily at a position far away from the target position and to follow closely to a target position near the target position.

By changing the maximum rotational angle $\theta_{2max}$ of the link $L_1$ and a parameter "a" of the following function corresponding to the virtual target curves, different functions are formed. A point (the origin in this case) on two (2) curves (1) and (2) corresponding to two (2) functions are set as the virtual target values.

$$\theta_{az} = \theta_{zmax}\left[\frac{2}{1 + \exp[\alpha(\theta_1 - \theta_{t1})]} - 1\right]$$

$$\theta_{az} = \theta_{zmax}\left[\frac{2a\exp[\alpha(\theta_1 - \theta_{t1})]}{(1 + \exp[\alpha(\theta_1 - \theta_{t1})])^2}\right]\theta_1$$

Figure 8:
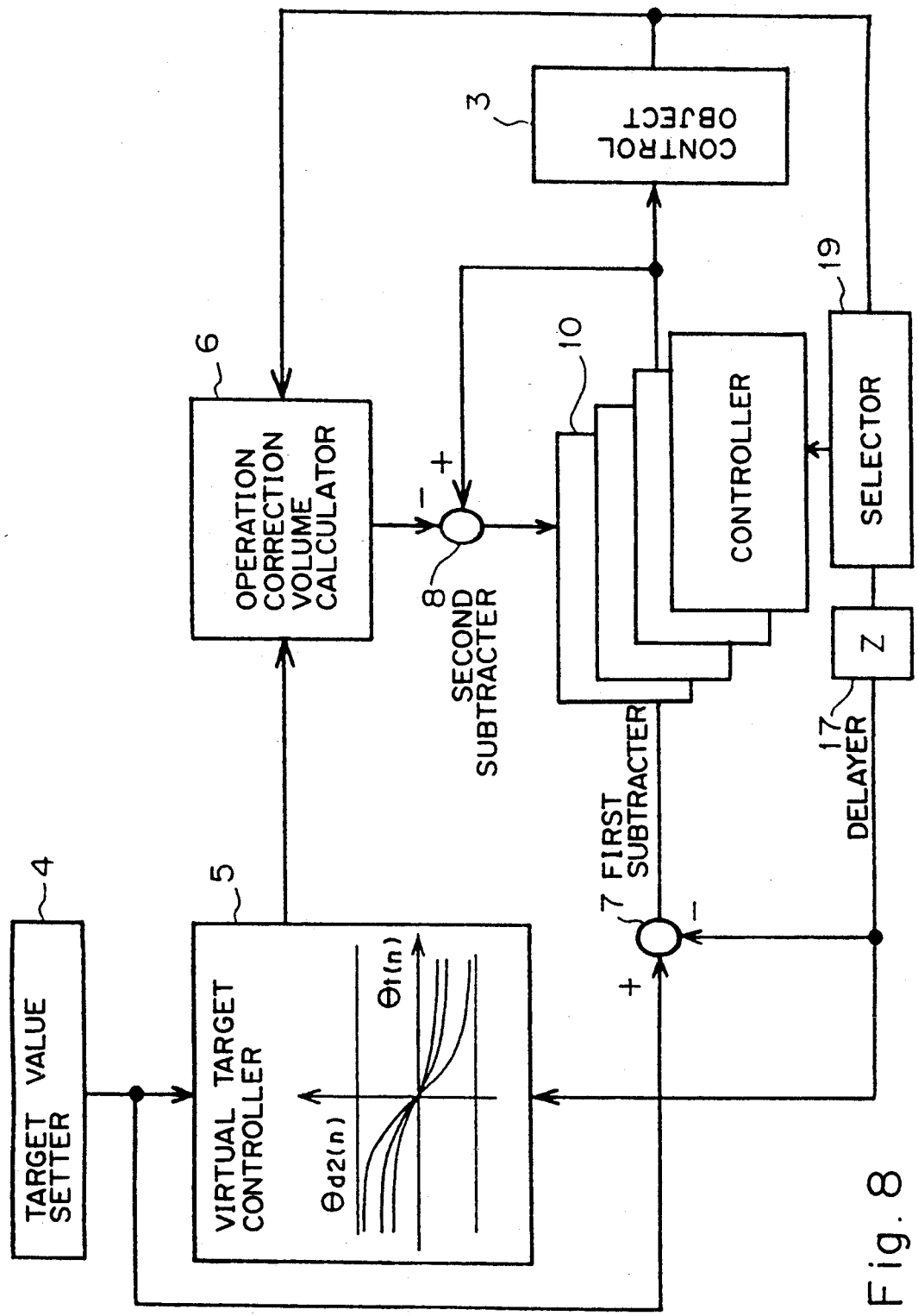
FIG. 8 illustrates a block diagram of another embodiment of this invention.

FIG. 8 illustrates a variant configuration of other embodiment of this invention shown in FIG. 7.

The parts in FIG. 8 which are the same as those in FIG. 1 have the same numbers.

The configuration shown in FIG. 8 is different from that shown in FIG. 1 in that the virtual target controller 5 uses a plurality of curves (functions) corresponding to plural virtual target values and that controllers 10 shown in FIG. 8, provided respectively for the plurality of curves (functions) used by the virtual target value controller 5, comprise the neural network 1 and the learning processor 2. The controllers 10 respectively learn the curves (functions) corresponding to virtual target values. That is, different controllers 10 learn the functions corresponding to different virtual target values. That is, this embodiment presents a system, in which virtual target value are preset according to the system state and the controllers are changed whenever the system state changes seasonally during a learning.

The controllers 10 are trained in advance to supply an output approaching a given virtual target value. At this time, by reducing a virtual target value the inverted pendulum 12 is made more difficult to fall. Alternatively, by raising a virtual target value the inverted pendulum 12 is made faster to approach the target position. Hence, by using the two (2) kinds of virtual target values expressed by curves (1) and (2), it becomes possible to make the inverted pendulum 12 to fall by reducing the change in the virtual target value theta$_{d2}$ of the rotational angle of the link $L_2$ even if the rotational angle theta$_1$ of the base link $L_1$ changes by using curve (1) at away from the target value, whereas the inverted pendulum 12 follows the target faster near the target value. That is, one (1) virtual target value need only be learnt first, and another different virtual target value is learnt next.

During an execution of an inversion control, a selector 19 selects a controller having learnt a curve (function) with a less gradient at a position away from the target value, and a controller having learnt a curve (function) with a greater gradient at a position near the target value.

Figure 9:
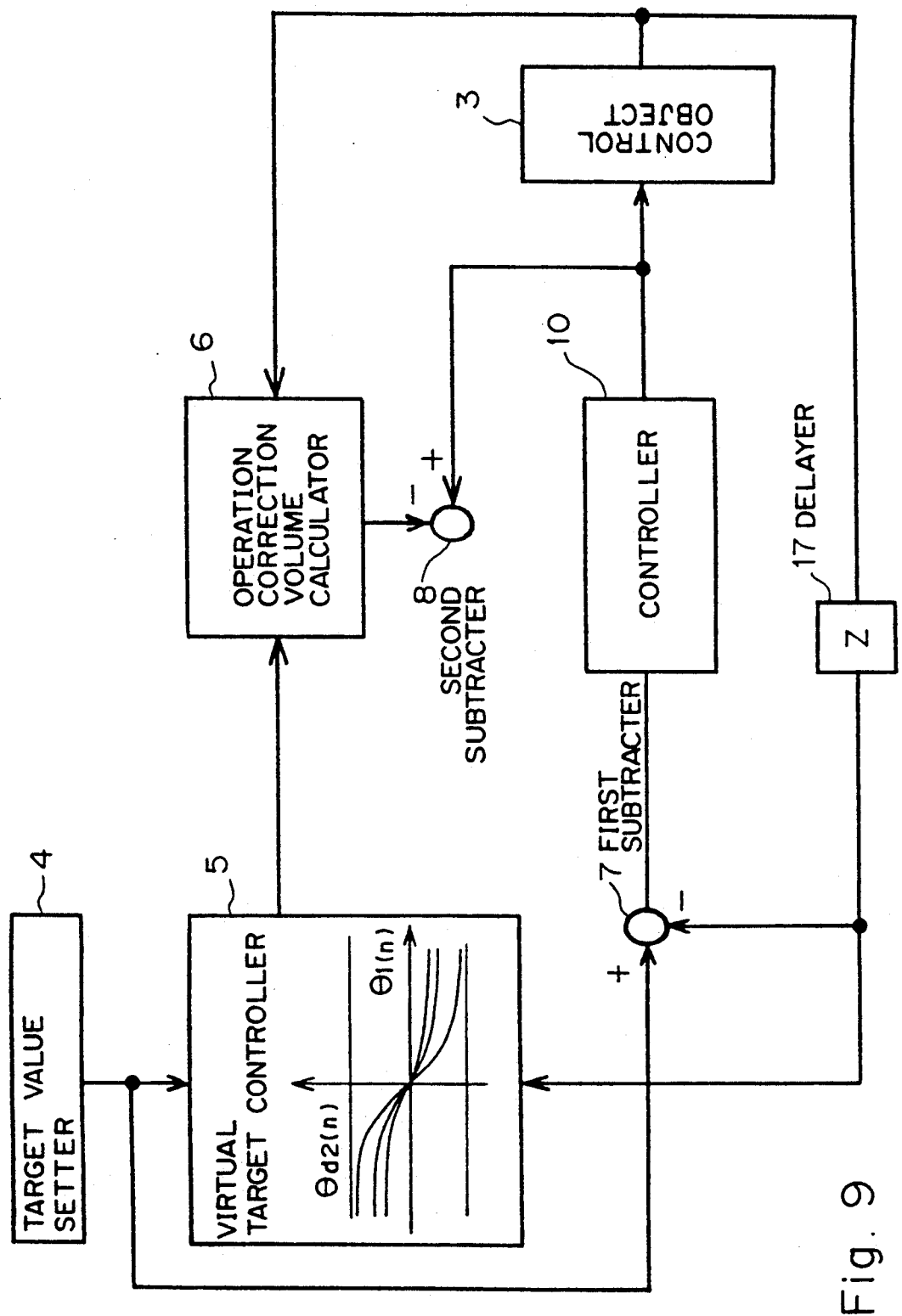
FIG. 9 is a block diagram of yet another embodiment.

FIG. 9 is a block diagram of yet another embodiment.

The configuration shown in FIG. 9 is different from that shown in FIG. 8 in that it has only one (1) controller 10 having learnt the single curve (function), shown in FIG. 9, synthesized from a plurality of curves (functions) for use by the virtual target controller 5.

The selector 19 is unnecessary during an execution of an inversion control unlike the embodiment shown in FIG. 8, because the controller 10 has already learnt the curve (function).

As described above, this invention causes teacher signals for a control object, which is qualitatively known to some extent with some advance knowledge but not quantitatively known to a large extent, to be obtained by trials. It also causes control rules for the control object to be projected on the signal conversion functions of the data processor. It further causes a data processor to be structured according to the differences between the control state volumes and their target values. Therefore, it becomes possible to restart a learning even when the target value of the control state volume is changed. This enables a control apparatus for a nonlinear control object to be structured with ease in a generic control rule format.

This invention has a configuration such that a correction volume calculator calculates the correction volumes of control operation volumes for generating the teacher signals in realizing the above according to linear equations without causing a change in the response characteristics of the control object. Therefore, it enables the control rules to be more fit for the response characteristics of the control object and the control apparatus to be structured within a shorter period of time.

What is claimed is:

1. A control apparatus structuring system comprising:
    a data processing means having a variable signal conversion function which is operated by setting said signal conversion function to realize the input/output characteristics of a given teacher signal group;
    a virtual target controlling means for controlling advance knowledge about data relations between control state volumes obtained for realizing a desired control state of a control object; and
    an operation correction volume calculating means for calculating a necessary correction volume of said control state volume for realizing a desired control state from a control state volume of a control object and a virtual target value of said control state volume correspondingly defined by control data from said virtual target controlling means, upon receiving a control operation volume wherein:

said control apparatus structuring system structures said data processing means to a control apparatus for realizing a desired control state by giving an input of said control state volume to said data processing means, by supplying, as said control operation volume, an output corresponding to said input, to said control object, by obtaining a teacher signal through a correction of said control operation volume according to the correction volume outputted from said operation correction volume calculating means, and by setting said signal conversion function according to the obtained teacher signal;

said data processing means receives either the difference between a control state volume outputted from a control object and a targeted control state volume or a value corresponding to said difference; and said virtual target controlling means controls the advance knowledge about data relations between control state volumes by parametrizing the difference between a control state volume and its control target value.

2. The control apparatus structuring system according to claim 1, wherein:

said operation correction volume calculating means calculates the correction volume of a control operation volume by multiplying, by a weighting coefficient, the difference between a control state volume of a control object and a virtual target value outputted from said virtual target controlling means.

3. The control apparatus structuring system according to claim 1, wherein:

said data processing means comprises a network structure unit composed of internal combinations of basic units each for receiving one or more than one input and a corresponding internal state value, for calculating a sum of the products between said input and said corresponding internal state value, and for obtaining an output value by converting said sum of the products by a predetermined function.

4. A control apparatus structuring system comprising:

a virtual target controlling means for calculating a virtual target value of a second variable from the difference between a targeted control state volume and a current control state volume of a first variable according to a predetermined target curve;

an operation correction volume calculating means for calculating a correction volume of an input signal of a control object by using current values of said first and second variables outputted from a control object and a virtual target value of said second variable;

a first operating means for calculating the differences between current values of first and second variables of a control object and target values of said first & second variables; and a second operating means for forming a new teacher signal from a current input signal supplied to a control object and from said correction volume of an input signal to said control object;

controlling means for learning to associate the relations between said first and second variables with data dependency relation determined by said virtual target controlling means through a use of said teacher signal on receiving said differences and using said teacher signals, for learning to maintain a data dependency relation set by said virtual target controlling means after putting said control object in a target value range, for, during an execution of a control, receiving a response result for said differences from said first operating means, based on a learning result, and for supplying said response result to said control object, said controlling means thereby causing said control object to attain a desired state according to said target value given by said target value setter.

5. The control apparatus structuring system according to claim 4, wherein said controlling means compose a neural network.

6. The control apparatus structuring system according to claim 5, wherein said neural network performs a learning by a back propagation algorithm.

7. The control apparatus structuring system according to claim 4, further provided with a plurality of such virtual target curves, said control apparatus structuring system further comprising:

a plurality of controlling means respectively learning said virtual target curves; and a selector for selecting one of said plural controlling means based on an output from current control object.

8. The control apparatus structuring system according to claim 4, further provided with a plurality of such virtual target curves, said control apparatus structuring system further comprising:

a selector for selecting said second variable for said first variable from variables on a plurality of virtual target curves.

9. A control apparatus comprising:

a virtual target controlling means for controlling at least a part of control variables expressed by a virtual target curve exhibiting an empirical rule in gaining a desired control state of a control object;

a plurality of controlling means for setting to a control object an input for realizing a virtual target value on said virtual target curve;

an operation correction volume calculating means for calculating a correction volume of an input signal to a control object by using a current output value from a control object and a virtual target value;

an operating means for forming an input signal to a new control object from a current input signal given to a control object and said correction volume of an input signal to said control object; and a teacher for teaching said plural controlling means about an input/output relation between an input regarding current control state volume of a control object for realizing a virtual target value calculated by said virtual target controlling means and an output given to an input to said control subject.

10. The control apparatus according to claim 9, wherein:

a plurality of controlling means respectively learning said input/output relation for realizing said virtual target curves; and one of said plural controlling means is selected based on a control state volume of said control object.

11. The control apparatus according to claim 10, wherein:

a plurality of controlling means learning said input/output relation for realizing said virtual target value by changing said virtual target curve.

* * * * *

UNITED STATES PATENT AND TRADEMARK OFFICE
CERTIFICATE OF CORRECTION

PATENT NO. : 5,285,377
DATED : February 8, 1994
INVENTOR(S) : Tamami Sugasaka et al.

It is certified that error appears in the above-indentified patent and that said Letters Patent is hereby corrected as shown below:

Col. 7, line 11, change "$\theta_1, \theta_2$" (second occurrence) to -- $\dot{\theta}_1, \dot{\theta}_2$ -- line 15, change "$\theta t_1, \theta t_2$" to -- $\dot{\theta} t_1, \dot{\theta} t_2$ --

Signed and Sealed this

Sixth Day of September, 1994

Attest:

BRUCE LEHMAN

*Attesting Officer*  *Commissioner of Patents and Trademarks*